United States Patent [19]

Stolarczyk et al.

[11] Patent Number: 5,408,182

[45] Date of Patent: Apr. 18, 1995

[54] FACILITY AND METHOD FOR THE DETECTION AND MONITORING OF PLUMES BELOW A WASTE CONTAINMENT SITE WITH RADIOWAVE TOMOGRAPHY SCATTERING METHODS

[75] Inventors: Larry G. Stolarczyk, Raton, N. Mex.; William E. Mondt, Westminster, Colo.

[73] Assignee: Rim Tech, Inc., Westminster, Colo.

[21] Appl. No.: 975,776

[22] Filed: Nov. 13, 1992

[51] Int. Cl.⁶ .......................... G01V 3/12; G01V 3/30; G01V 3/38

[52] U.S. Cl. ..................................... 324/338; 324/335

[58] Field of Search ............... 324/338, 337, 334, 335, 324/339, 324, 325, 326, 342–343; 342/459, 463; 364/422

[56] References Cited

U.S. PATENT DOCUMENTS

| | | | |
|---|---|---|---|
| 4,161,687 | 7/1979 | Lytle et al. | 324/338 |
| 4,742,305 | 5/1988 | Stolarczyk | 324/334 |
| 4,755,944 | 7/1988 | Glass | 324/372 |
| 4,808,929 | 2/1989 | Oldings | 324/338 |
| 4,994,747 | 2/1991 | Stolarczyk | 324/334 |
| 5,066,917 | 11/1991 | Stolarczyk | 324/338 |

OTHER PUBLICATIONS

K. A. Dines and R. J. Lytle, in "Computerized Geophysical Tomography," Proceedings of the IEEE, vol. 67, No. 7, Jul. 1979, pp. 1065–1073.

*Primary Examiner*—Kenneth A. Wieder
*Assistant Examiner*—Jay Patidar
*Attorney, Agent, or Firm*—Thomas E. Schatzel

[57] ABSTRACT

An embodiment of the present invention is a toxic waste containment facility subject to leaking hazardous plumes into soils beneath and adjacent to the site. The facility includes a plurality of substantially horizontal underground drillholes adjacent to and below a waste containment pit. A radio transmitter and antenna are placed in a first underground drillhole proximate to a surface waste containment site. A radio receiver and antenna are placed in a second underground drillhole opposite to the first drillhole. A position indicator is used for gauging a plurality of locations of the radio transmitter and antenna within the first underground drillhole and the radio receiver and antenna within the second underground drillhole. A data processing unit analyzes data received from radio receiver and antenna and position indicator to measure radio signal attenuation between the radio transmitter and antenna and radio receiver and antenna. The transmitted signal from the radio transmitter and antenna are synchronized by a signal from the data processing unit. Fiber optic cables are used to couple signals between the radio transmitter and antenna and radio receiver and antenna with the data processing unit. Along each path, the operating frequency is increased until all of the transmitted energy is absorbed along the path to maximize resolution. Tomographic techniques are used to translate the data collected from a variety of transmitter and receiver positions into attenuation profiles that can image a toxic plume beneath the containment pit.

22 Claims, 6 Drawing Sheets

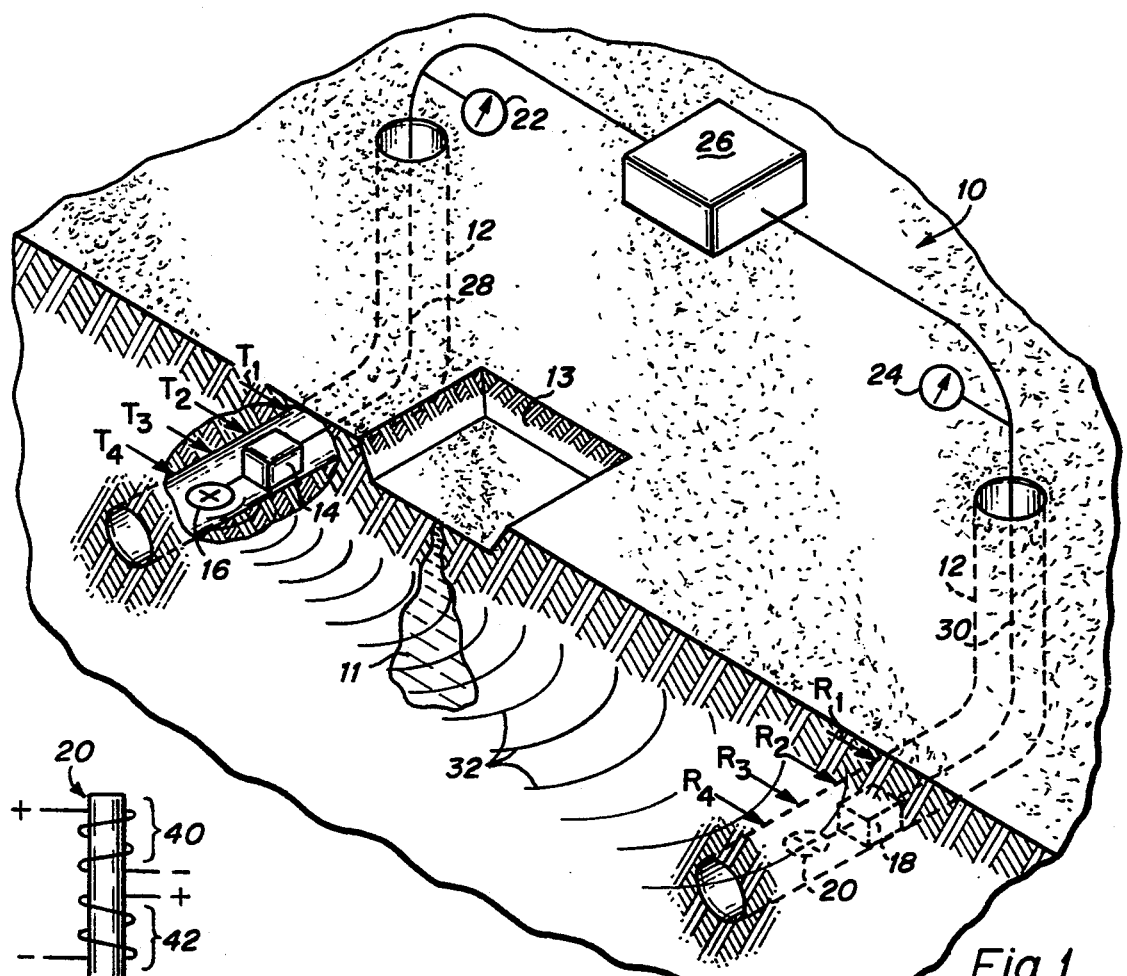
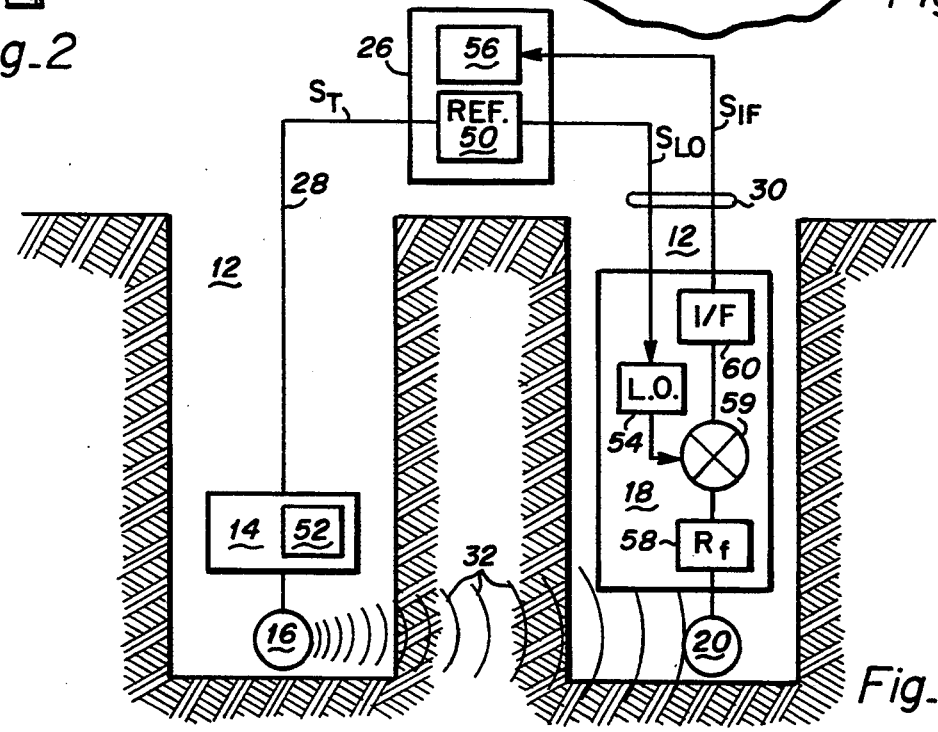

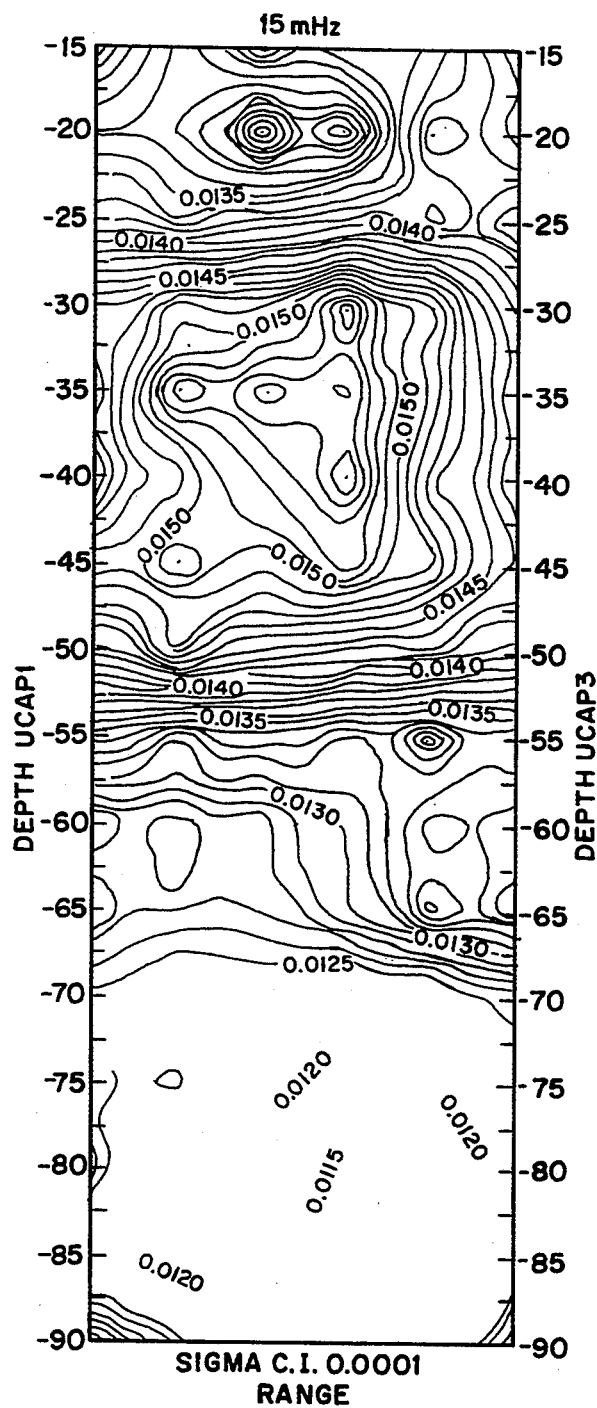
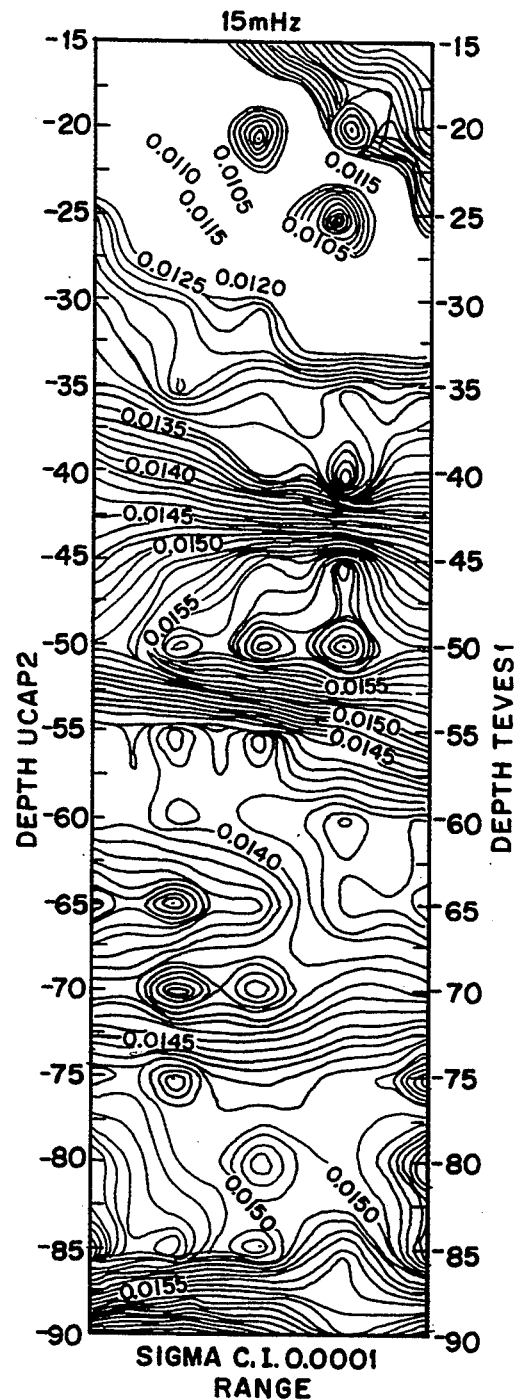
Fig. 5
Fig. 6

FACILITY AND METHOD FOR THE DETECTION AND MONITORING OF PLUMES BELOW A WASTE CONTAINMENT SITE WITH RADIOWAVE TOMOGRAPHY SCATTERING METHODS

BACKGROUND OF THE INVENTION

1. Field of the Invention

The invention relates generally to toxic waste containment site management equipment and methods and specifically to tomographic equipment and methods that employ radiowaves to image a plume below a waste containment pit.

2. Description of the Prior Art

Hazardous byproducts of modern industry and radioactive wastes cannot be disposed of without due regard to the dangers associated with the waste. Such waste may remain hazardous for years and may be toxic in even small quantities. Therefore, such materials cannot be allowed to seep into soils or move through underground water aquifers because of the potential dangers to food and water supplies and plant, animal and fish environments. Very commonly such wastes are deposited in waste containment sites that are membrane-lined clay pits. Government regulations dictate that such sites be monitored for leakage, because numerous such sites have leaked and caused severe environmental damage. Such leakage takes the form of a plume, and comprises a toxic mixture of chemicals, therefore the term "toxic plume" has been coined to describe mobile underground leaks.

Monitoring wells encircling waste containment sites are often used to obtain water and soil samples for laboratory analysis and compliance with government regulations. Sensing a toxic plume flow is hit-or-miss, and depends upon the geology and hydrology of the underlying layers. Generally speaking, a monitoring well must intersect a toxic plume for the plume to be detected. Several such wells that intersect a toxic plume may be needed to judge a plume's velocity and the results of any mitigation efforts. For practical reasons, the number of wells must be limited, thus a plume may not ever contact any of the monitoring wells, and go undetected.

The underlying geology and hydrology of a waste containment site can be determined with substantially one hundred percent coverage with just a few monitoring wells located outside the immediate perimeter of a pit by employing radiowave tomography scanning. Both vertical and horizontal wells may be used to host a transmitting antenna in one well and a receiving antenna in an adjacent well. One or both antennas are moved successively to various points and a measurement of the intervening geology's attenuative affect and phase shift affect on the radio signals is taken. Tomography scanning and data processing can help to visually determine the electrical conductivity represented in each displayed pixel analogous an image plane.

U.S. Pat. No. 5,066,917, issued Nov. 19, 1991, to the present inventor, Larry G. Stolarczyk, describes a two borehole method for detecting an anomalous geological zone in a rock layer using radiowave scans to map conductivity changes in the rock layer. (See, the discussion related to FIG. 19.) A second higher frequency scan yields a tomography scan that includes both background conductivity changes and a diffraction shadow. Geologic noise is then eliminated from the tomography scan to net a tomographic image from the diffraction shadow due to the anomalous geological zone.

K. A. Dines and R. J. Lytle, in "Computerized Geophysical Tomography," *Proceedings of the IEEE*, Vol. 67, No. 7, July 1979, pp. 1065–1073, describe using computerized tomography techniques as an aid in geophysical exploration. Detailed pictures of the electromagnetic properties of the regions between a pair of boreholes can be reconstructed. Iterative solution techniques are used to solve large sets of linear equations related to the line integral data and remote observables.

Radiowaves propagating along subsurface paths are highly sensitive to the electrical parameters of a geologic medium, e.g., conductivity $(\sigma)$, permittivity $(\epsilon)$, and magnetic permeability $(\mu)$. The attenuation rate $(\alpha)$ and phase $(\beta)$ constants of the propagating electromagnetic wave depend upon the electromagnetic parameters of the rock mass as:

$$\alpha = \beta = \sqrt{\frac{\omega\mu\sigma}{2}} \quad (\sigma >> \omega\epsilon) \tag{1}$$

where:

$\omega = 2\pi d$ = radiating frequency (f in Hertz), $\mu = \mu_r\mu_o$ = the magnetic permeability where $\mu_r$ is the relative permeability constant and $\mu_o$ is the absolute permeability of free space $(4\pi \times 10^{-7}$ henry/meter), $\epsilon = \epsilon_r\epsilon_o$ = the electrical permittivity of the medium where $\epsilon_r$ is the relative permittivity constant and $\epsilon_o$ is the absolute permittivity of free space $(1/36\pi \times 10^{-9}$ farad/meter), and $\sigma$ = the effective conductivity of the medium in Siemens/meter.

In non-magnetic rocks, the relative permeability is near unity. The conductivity $(\sigma)$ is proportional to the porosity of the soil and the electrical conductivity of the pore space fluid. Equation (1) shows that the signal attenuation rate $(\alpha)$ in nepers (Np) per meter (Np=8.686 dB) and phase $(\beta)$ in radians per meter are proportional to the half power of the conductivity of the medium and the frequency of the radiowave. Radiowave imaging (RIM) may be used to acquire and process the measured data and to determine the contours of constant attenuation rate and phase across the image plane between drillholes. Equation (1) can be used to determine the conductivity distribution in an image plane between drillholes.

Radiowave tomography scanning can help construct representative images of the electrical conductivity of the site medium between sensing wells. Continuous wave (CW) monochromatic radio signals propagate over signal paths in the target geologic zone. In a conductive medium, only the geology within the first Fresnel ellipsoid significantly influences the conductivity of the zone (see, Hill, "Diffraction by a half-plane in a lossy medium," *J. Applied Physics*, Vol. 10, June 1991; and see, Parkhomenko, *Electrical Properties of Rocks*, Plenum Press, NY:1967, [illustrates the dependence of inverse conductivity in rocks]). Increasing the operating frequency decreases the minor and major axes of the ellipsoid. Increasing the operating frequency such that all of the radiowave energy is absorbed along the path between transmitter and receiver locations maximizes the resolution in the image.

The conductivity of a rock mass is dependent on the amount of water present, the water's conductivity, and the variation in porosity in the target zone. Full saturation is limited by the available porosity. In alluvium, clays and moisture react to increase the conductivity of the target zone. The conductivity of dry tuff approaches seventeen millisiemens/meter. When saturated with moisture, the conductivity increases to thirty-seven millisiemens/meter. Therefore, migrating liquid masses, such as toxic plumes, may be tomographically imaged.

SUMMARY OF THE PRESENT INVENTION

It is therefore an object of the present invention to provide a monitoring system for comprehensive evaluation of the soils underlying a waste containment pit.

It is a further object of the present invention to provide a relatively non-intrusive method for detecting the presence of and migration velocities of mobile bodies within rock masses that invoke changes to the electrical parameters of the rock mass, such as conductivity and permittivity changes.

Briefly, an embodiment of the present invention is a toxic waste containment facility subject to leaking hazardous plumes into soils beneath and adjacent to the site. The facility includes a plurality of substantially horizontal underground drillholes adjacent to and below a waste containment pit. Slanted and vertical drillholes may also be used. A radio transmitter and antenna are placed in a first underground drillhole proximate to a surface waste containment site. A radio receiver and antenna are placed in a second underground drillhole opposite to the first drillhole. A position indicator is used for gauging a plurality of locations of the radio transmitter and antenna within the first underground drillhole and the radio receiver and antenna within the second underground drillhole. A data processing unit analyzes data received from radio receiver and antenna and position indicator to measure radio signal attenuation and phase shift between the radio transmitter and antenna and radio receiver and antenna. The transmitted signal from the radio transmitter and antenna is synchronized by a signal from the data processing unit. To prevent metallic interconnections from re-radiating the transmitted signal, fiber optic cables are used to couple signals between the radio transmitter and antenna and radio receiver and antenna with the data processing unit. Along each path, the operating frequency is increased until all of the transmitted energy is absorbed along the path. Tomographic techniques are used to translate the data collected from a variety of transmitter and receiver positions into attenuation profiles that can image a toxic plume beneath the containment pit.

An advantage of the present invention is that a system is provided that can comprehensively monitor toxic plume development and migration with relatively non-invasive and economical techniques.

Another advantage of the present invention is that a system is provided that permits tomographic two and three-dimensional images to be generated that allow users to quickly interpret large volumes of data gathered by the system.

A further advantage of the present invention is that a method is provided in which government mandated drillhole sampling for toxic plumes can be legally challenged with the superior data made obtainable.

Another advantage of the present invention is that a system is provided that resolution is maximized by increasing the operating frequency such that all of the transmitted energy is absorbed along the path between drillholes.

Another advantage of the present invention is that a system is provided that permits improved imaging because a receiving antenna with two identical magnetic dipole elements may be connected in either a summing mode or a differencing mode. In the summing mode the antenna responds to both the primary and secondary fields. In the differencing mode the antenna responds only to the secondary field.

A still further advantage of the present invention is that a tomographic processing of the secondary field is provided that improves resolution in an image.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is an elevational, partially sectioned view of a surface toxic waste containment facility embodiment of the present invention;

FIG. 2 is a diagram of a gradiometer type of receiving antenna included in the facility of FIG. 1;

FIG. 3 is block diagram of a signal synchronizing connection between the transmitter and receiver included in the facility of FIG. 1;

FIG. 5 is a tomographic diagram of an image plane obtained between two boreholes, UCAP1 and UCAP3, in an experiment involving the present invention and using a carrier frequency of fifteen MHz;

FIG. 6 is a tomographic diagram of an image plane obtained between two boreholes, UCAP2 and TEVES1, in said experiment involving the present invention;

DETAILED DESCRIPTION OF THE PREFERRED EMBODIMENTS

Figure 4:
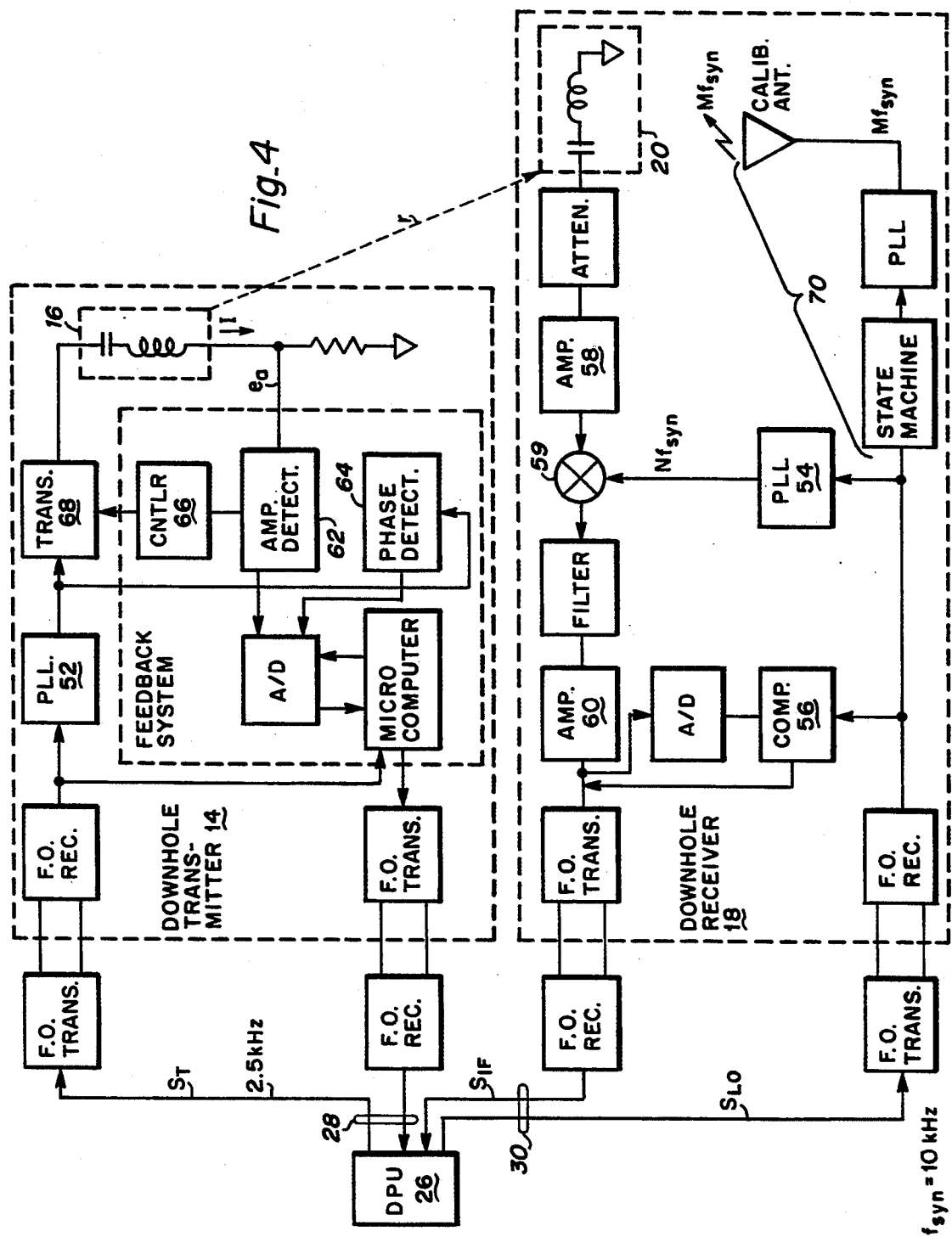
FIG. 4 is a block diagram of the transmitter and receiver included in the facility of FIG. 1.
Figure 7:
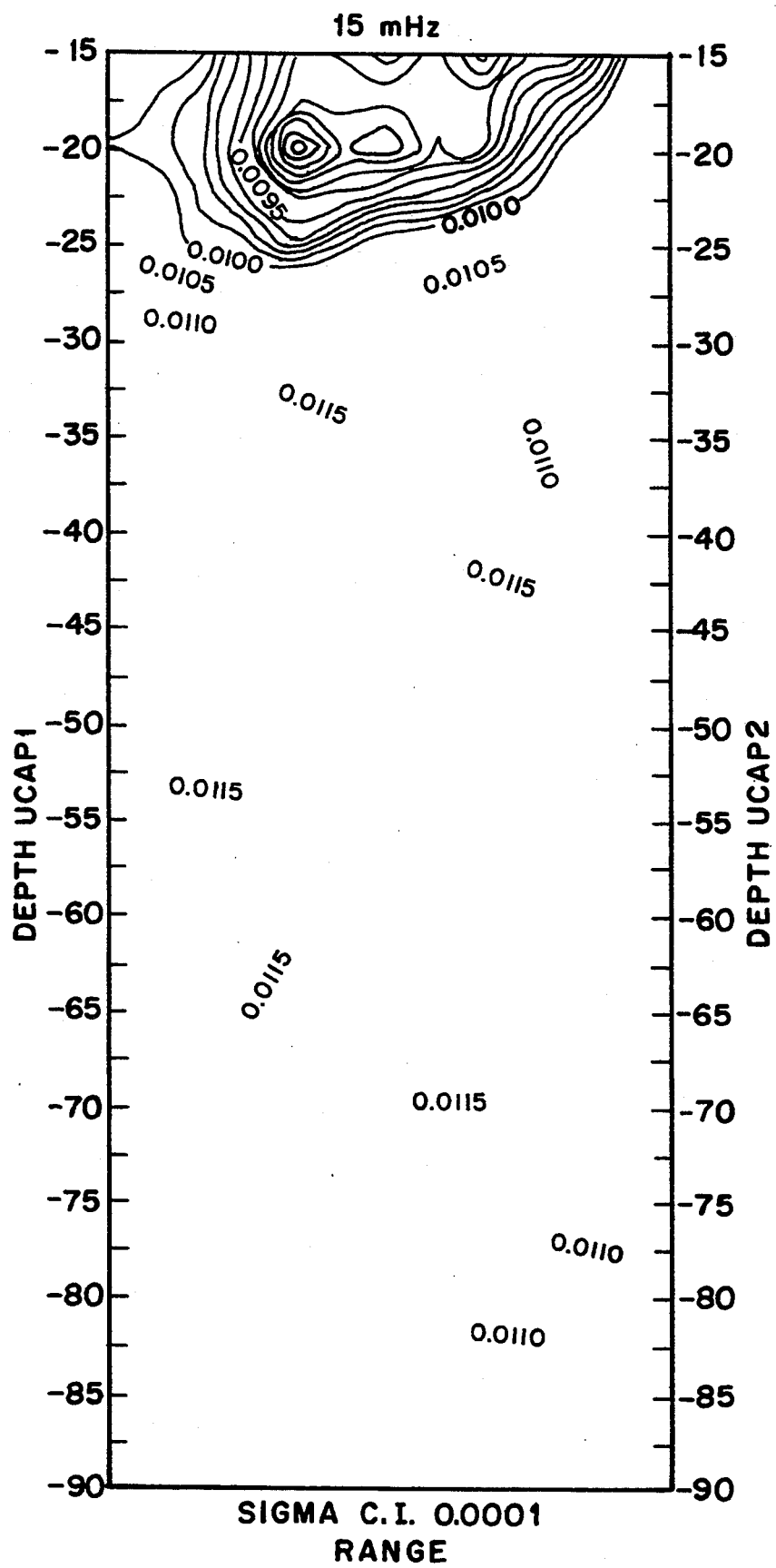
FIG. 7 is a tomographic diagram of an image plane obtained between two boreholes, UCAP1 and UCAP2, in said experiment involving the present invention.
Figures 8, 10:
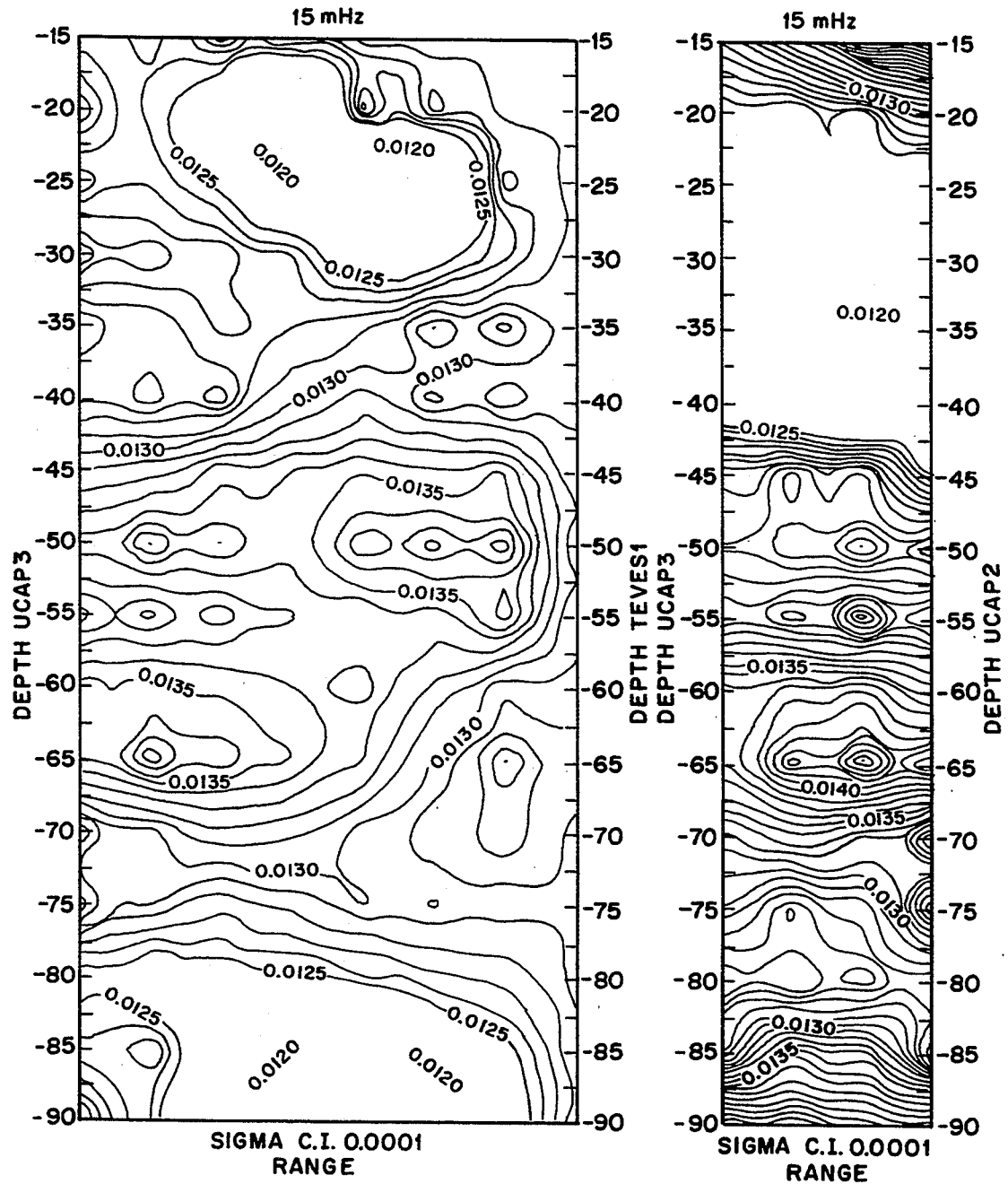
FIG. 8 is a tomographic diagram of an image plane obtained between two boreholes, UCAP3 and TEVES1, in said experiment involving the present invention.
FIG. 10 is a tomographic diagram of an image plane obtained between two boreholes, UCAP3 and UCAP2, in said experiment involving the present invention.
Figure 9:
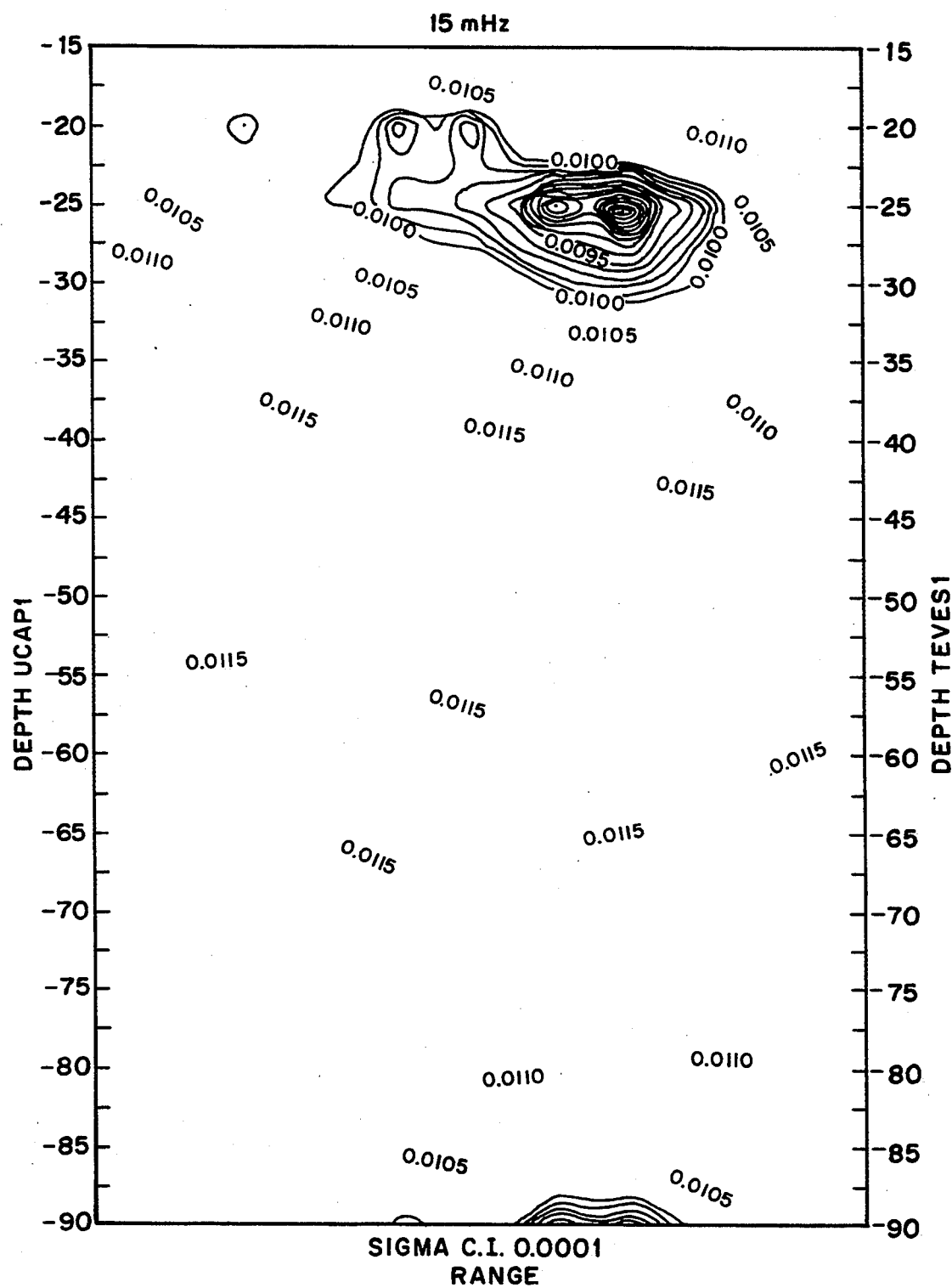
FIG. 9 is a tomographic diagram of an image plane obtained between two boreholes, UCAP1 and TEVES1, in said experiment involving the present invention.

Prior art methods and apparatus, together with a detailed theoretical discussion of using radio transmitters and receivers in boreholes to sense underground features in rock layers are included in two United States Patents issued to the present inventor, Larry G. Stolarczyk, and are incorporated herein by reference as if fully laid out. The two patents are 5,066,917, issued Nov. 19, 1991, and 4,994,747, issued Feb. 19, 1991.

FIG. 1 illustrates a surface toxic waste containment facility 10 that is subject to leaking hazardous liquids and/or gases in the form of a plume 11 into soils beneath and adjacent to the site of facility 10. Plume 11 may comprise oxidizers, chromates and/or reducers. Plume 11 may be mobile within the soils and will affect the electrical conductivity of such soils in a manner that will attenuate radio signals to a greater or lesser extent than do the soils not included in plume 11. Facility 10 comprises a plurality of substantially horizontal underground drillholes 12 adjacent to and below a waste containment pit 13, a radio transmitter 14, a transmitting antenna 16, a radio receiver 18, a receiving antenna 20, a pair of indicators 22 and 24 for determining the positions of the radio transmitter and antenna 14 and 16 within one underground drillhole 12 and the radio receiver and antenna 18 and 20 within another underground drillhole 12, a data processing unit (DPU) 26, and a pair of non-metallic fiber-optic cables 28 and 30 for coupling signals between the radio transmitter 14 and radio receiver 18 with the DPU 26. DPU 26 may be constructed of a conventional microcomputer and associated program software.

Power to operate transmitter 14 and receiver 18 may be provided by batteries or by pumping laser energy along fiber optic cables to transmitter 14 and receiver 18. The elimination of conductive cables leading out of drillholes 12 is necessary to eliminate a possible source of very strong primary field radiowaves.

Drillholes 12 may either be horizontal or vertical, and are roughly parallel to one another. A radiowave signal 32 is transmitted from antenna 16 to antenna 20. Non-conductive fiber optic cable is used to interconnect DPU 26 with the down-the-hole instrumentation, because this prevents generation of "cable" waves that may exhibit cylindrical spreading electromagnetic radiation in a slightly conducting medium, which could severely interfere with the required measurements based on radiowave signals. Such cylindrical spreading waves may interfere with spherical-spreading waves from the transmitting dipole at the location of receiver 18. Drillholes 12 may be eight inch diameter holes dug with a backhoe and lined with plastic pipe, or for example dug with a DITCHWITCH ™ excavator, to be parallel and/or orthogonal with one another such that image planes between drillholes 12 may be defined. Preferably, multiple image planes are used to enable three-dimensional imaging of plume 11. The taking of the same image plane over successive time periods allows movement to be discovered. A typical pit 13 at the Hanford, Wash., weapons-grade uranium processing facility is eight feet wide and sixteen feet long. Data processing unit 26 analyzes data from the radio receiver 18 and position indicators 22 and 24 to measure the radio signal attenuation and phase shift along paths between the transmitter antenna 16 and receiver antenna 20 at a variety of positions T1–T4 and R1–R4. Along each path, the operating frequency of transmitter 14 and receiver 18 is increased until all of the transmitted energy in signal 32 is absorbed along the particular path to maximize measurement resolution.

FIG. 2 shows receiver antenna 20 in greater detail. An E-field radiated by transmitter antenna 16 may be absorbed by a conductive object in the soils between drillholes 12 that will re-radiate a secondary E-field with a polarization angle different from the original E-field. Such secondary E-field emissions are sometimes referred to as scattered waves. Antenna 20 is an electromagnetic gradiometer type dipole antenna in which a first winding 40 is wound in an opposite direction to a second winding 42. Currents in windings 40 and 42 can then either be summed or subtracted, depending on the type of radiowave measurement desired. When the currents are subtracted, primary E-field emissions can be canceled, leaving only the secondary E-fields to be sensed. A gradiometer type antenna in the differencing mode is thus more sensitive to scattered radiowaves and the detection of conductive bodies within the soils can therefore be improved. In the summing mode antenna 20 provides an ordinary dipole response, which is to respond to both the primary and scattered secondary fields.

FIG. 3 illustrates the coherent signal generation and collection of facility 10. A reference oscillator 50 within DPU 26 generates a reference signal from which a synchronous transmitter signal ST and receiver local oscillator (LO) signal SLO are derived. A transmit phase lock loop (PLL) 52 uses ST to provide transmitter 14 with a synchronous carrier frequency. A receiver LO PLL 54 uses $S_{LO}$ provide receiver 18 with a synchronous frequency for super-heterodyning to an intermediate frequency signal ($S_{IF}$). A phase detector 56 is then able to provide phase shift information to DPU 26. Alternatively, a phase detector 56' may be located within receiver 18, as is illustrated in FIG. 4. A radio frequency amplifier 58 inputs signals received by antenna 20 and mixes them with the LO output in a mixer 59. An intermediate frequency (IF) amplifier boosts the output of $S_{IF}$ for cable 30. Stolarczyk '747 and '917 provide greater detail regarding the configuration and functioning of such synchronous equipment.

FIG. 4 illustrates transmitter 14, receiver 18 and fiber optic interconnections 28 and 30 with DPU 26. Stolarczyk '917 describes the preferred configurations for transmitter 14 and receiver 18, which include calibration means for antennas 16 and 20. Calibration for both the receiver and transmitter are required so that the magnetic moments produced by transmitter 14 will be known, together with phase information, and the sensitivity of receiver 18 and its phase will also be known. This then permits the total phase shift experienced by signal 32 along a path (r) to be measured in absolute terms. The phase shift is expressed mathematically as, $$\phi_T = -\beta r + \tan^{-1} \frac{1 + 2\left(\frac{\alpha}{\beta}\right)(\beta r)}{\frac{1}{\beta r} - \beta r + \left(\frac{\alpha}{\beta}\right)^2 \beta r + \left(\frac{\alpha}{\beta}\right)}, \quad (2)$$

where, $\alpha$ is an attenuation constant, and $\beta$ is a phase constant.

This relation is further defined in Stolarczyk '917 at column 11, lines 20–40. In general, the solution to the equation based on phase measurement inputs yields important data about the electrical parameters of the geology between locations T1–T4 and locations R1–R4.

The received signal is translated in receiver 18 to a lower intermediate frequency (IF) signal. A phase coherent frequency transition process in receiver 18 retains the magnitude and phase of the received signal. The IF signal ($S_{IF}$) is sent along cable 30 and measured by DPU 26.

The radiating magnetic dipole antenna 16 launches an electromagnetic wave (signal 32) that travels along various paths to the companion receiving antenna 20 at different points in drillhole 12. The instruments preferably measure magnitude to a resolution of 0.5 dB and phase to a resolution of one degree. The field components of the electromagnetic wave are produced by the radiating magnetic dipole antenna 16.

A Cartesian coordinate system (x, y, z) is oriented so that a main loop of antenna 16 lies in the horizontal x-y (equatorial) plane with its vertical magnetic moment aligned along the z axis (north to south pole axis). The magnetic moment (M) is a vector given by:

M=NIA ampere turn meter$^2$, where N=number of turns in the loop antenna,
I=peak current flowing in the antenna in amperes, and
A=area of the loop in meters.

A spherical coordinate system ($\theta$, $\phi$, r) is used to describe the general orientation of field components in the geological medium. When the physical dimension of the antenna loop is small, relative to the wavelength ($\lambda$), the magnetic dipole field component can be described as:

meridian plane azimuthal component in ampere per meter, $$H_\theta = \frac{Mk^3}{4\pi}\left[\frac{1}{(kr)^3} + \frac{i}{(kr)^2} - \frac{1}{(kr)}\right]e^{-ikr}\sin\theta, \quad (3)$$

meridian plane radial component in amperes per meter, $$H_r = \frac{Mk^3}{2\pi}\left[\frac{1}{(kr)^3} + \frac{i}{(kr)^2}\right]e^{-ikr}\cos\theta, \text{ and} \quad (4)$$

longitudinal component in volts per meter $$E_\phi = \frac{i\mu\omega Mk^2}{4\pi}\left[-\frac{1}{(kr)^2} - \frac{i}{(kr)}\right]e^{-ikr}\sin\theta. \quad (5)$$

Where $\omega = 2\pi f_0$ and $f_0$ is the operating frequency in Hertz, $$i = \sqrt{-1}, \quad (6)$$

and r=radial distance from the radiating antenna in meters.

The complex wave number is $$k = \beta - i\alpha, \quad (7)$$

where $\beta$ is the phase constant in radians per meter, $$\beta = \omega\left[\frac{\mu\epsilon}{2}\left(\left[1 + \left(\frac{\sigma}{\epsilon\omega}\right)^2\right]^{\frac{1}{2}} + 1\right)\right]^{\frac{1}{2}} \text{ and,} \quad (8)$$

$\alpha$ is the attenuation rate in nepers per meter, $$\alpha = \omega\left[\frac{\mu\epsilon}{2}\left(\left[1 + \left(\frac{\sigma}{\epsilon\omega}\right)^2\right]^{\frac{1}{2}} - 1\right)\right]^{\frac{1}{2}}. \quad (9)$$

The magnetic field vectors lie in the meridian plane. The electric vector ($E_\phi$) is perpendicular to the meridian plane and subscribes concentric circles around the z axis magnetic dipole moment vector. When the operating frequency approaches zero, the electric field component vanishes. This fact has serious implications in subsurface imaging since conduction (galvanic) current vanishes along with the E-field. Scattered secondary response intensity decreases as frequency approaches zero. The terms in equations (3), (4) and (5) are arranged in the inverse power of r. The radial distance $r = \lambda/2\pi$ is the radius of a spherical surface that divides the "near" field and "far" fields of a dipole antenna. When conduction currents dominate in a media, the radial distance (r) is the skin depth. In the immediate neighborhood of the magnetic dipole, the near field "static" and "induction" fields ($1/r^3$ and $1/r^2$ terms) predominate, while in the far field at distance $r \gg \lambda/2\pi$ or $\kappa r \gg 1$, only the "radiation" field ($1/r$ term) has significant value. The radiation fields are:

$$H_\theta = \left[\frac{Mk^3}{4\pi}\right]\frac{e^{-ikr}}{kr}\sin\theta, \quad (10)$$

and, $$E_\phi = \left[\frac{\mu\omega Mk}{4\pi}\right]\frac{e^{-ikr}}{kr}\sin\phi. \quad (11)$$

The radiation fields are transverse (orthogonal), which is expected of wave propagation at great distances from all electromagnetic sources.

The magnitude of the voltage induced in the receiving loop antenna 20 by the magnetic field component is given by Faraday's law as $$|emf| = \omega\mu_0(\mu_r An)|H_\theta|, \quad (12)$$

where:

n is the number of turns in the receiving loop antenna,
A is the area of the antenna loop antenna in square meters, and
$\mu_r$ is the relative permeability of a ferrite rod used in the construction of the antenna.

In the $\theta = \pi/2$ equatorial plane, which includes antennas 16 and 20, the output voltage of receiving antenna 20 can be determined by substituting the magnitude of equation 10 into equation 12. When conduction currents predominate in the medium, the squared magnitude of the complex wave number (k) becomes $|k^2| = \omega\mu\sigma$. The magnitude of the output voltage of receiving antenna 20 is, $$|emf| = c\frac{e^{-\alpha r}}{r}, \quad (13)$$

where $$c = \frac{\omega^2\mu_0(\mu_r An)M[\sigma\mu]}{4\pi}. \quad (14)$$

A coupling factor (c) depends upon the second power of the operating frequency. The coupling factor also depends on the first power of the radiating antenna magnetic moment (M) and electrical parameters [$\sigma\mu$] of the medium.

The total phase shift is given by equation (2), and repeated here for convenience:

$$\phi_T = -\beta r + \tan^{-1} \frac{1 + 2\left(\frac{\alpha}{\beta}\right)(\beta r)}{\frac{1}{\beta r} - \beta r + \left(\frac{\alpha}{\beta}\right)^2 \beta r + \left(\frac{\alpha}{\beta}\right)} . \qquad (15)$$

When conduction currents predominate in a rock mass ($\alpha/\beta=1$), the second term approaches 90° when $\beta r > 10$.

In the operation of facility 10, a plurality of measurements are collected related to the attenuating effects on signal 32 for the soil in a plane that includes positions T1–T4 and R1–R4. The attenuation data may be resolved to a smallest spot on the plane defined as a pixel. A solution to the attenuation values of each and every pixel is calculated by data processing unit 26, using conventional linear equations and tomography techniques to arrive at a solution set. When more than two drillholes 12 are included in facility 10, additional pixel planes of data may be collected with additional transmitter and receiver positions and used to generate three-dimensional tomographic images of the soils underlying pit 13.

Pit 13 may alternatively be fifty feet square and dug into alluvium soils, and may or may not be lined. In this case, drillholes 12 may comprise two-inch diameter polyvinyl chloride (PVC) pipe in trenches or horizontal drill holes surrounding four sides of pit 13. Imaging can also be accomplished by receiver measurements taken along the surface and a transmitter in a drillhole, or vice versa. By comparing images taken at different times, the formation and/or migration of plume 11 can be confirmed by data processing unit 26. A plume velocity (flux rate) can be determined by scanning the soils at regular time periods. Vertical scanning between vertical wells, such as the vertical sections of drillholes 12, may be used to study water distribution in a formation surrounding an aquifer under pit 13. Slanted drillholes are also useful for the same purpose.

Instrumentation included in data processing unit 26 are used to measure the magnitude and phase of the far field, radiating (1/kr) component of the electromagnetic wave. Phase synchronization signals are required in the measurement process and are provided by DPU 26, or from the receiver if the synchronous detector (56') is located in the receiver, over cable 28 to transmitter 14 and cable 30 to receiver 18.

Signal $S_T$ is generated to synchronize transmit signal 32. The signal $S_T$ may be represented by, $$S_T = A \sin(2\pi f_o t + \theta_1) \qquad (16)$$

where A = magnitude of the signal in volts,
t = on-going time in seconds,
$f_o$ = the operating frequency in Hertz,
and $\theta_1$ = the phase in electrical degrees of reference oscillator 50.

The synchronizing signal is amplified for transmitter 14 to drive antenna 16, which is an electrically-short, magnetic dipole antenna. The magnetic moment vector of the transmitting antenna 16 and area vector of the receiving antenna 20 are polarized along an axis of drillhole 12. The transmitted signal may be expressed as, $$S_T = A_T \sin(2\pi f_o t + \theta_1) \qquad (17)$$

The transmitted radio signal 32 propagates through the underlying geology producing a receiver location signal which has been both attenuated and shifted in phase. The electrical parameters of the rock mass, e.g., conductivity ($\sigma$) and permittivity ($\epsilon$), cause the magnitude of the sinusoidal radio signal to diminish (attenuate) along the path. The rock mass causes the radio signal to shift in phase by $\theta$ degrees. The received signal is represented by, $$S_R = A_R \sin(2\pi f_o t + \theta_1) \qquad (18)$$

A response by receiving antenna 20, where the output voltage equals electromotive force (emf), to the transmitted signal is amplified by RF amplifier 58 and mixed with the synchronized signal from local oscillator signal 54 in mixer 59 and output to an intermediate frequency (IF) stage 60. The local oscillator signal is represented by:

$$S_{LO} = B \sin(2\pi[f_o + f_{IF}]t + \theta_1) \qquad (19)$$

where $f_{IF}$ = the intermediate frequency of receiver 18.

The local oscillator frequency, $f_{IF}$, is 2500 Hertz away from the transmit signal frequency ($f_o$). This difference is achieved by a frequency transposition scheme within DPU 26. Because the signals are synchronized, the phase term $\theta_1$ in each of equations (18) and (19) is identical.

Mixer 59 effectively subtracts equation (19) from equation (18). Difference mixing eliminates the synchronized phase terms $\theta_1$ in equations (18) and (19) and generates an intermediate signal ($S_{IF}$), which is represented by:

$$S_{IF} = C \sin[2\pi[f_o + f_{if}]t - 2\pi f_o t + \theta_1 - \theta_1 + \theta_M] = C \sin[2\pi f_{IF} t + \theta_M] \qquad (20)$$

The measured phase term $\theta_M$ is the sum of all phase shifts encountered in the signal path, commencing at DPU 26 output terminal through the transmitter circuits, geologic medium and receiver circuits to the input terminal of DPU 26. The geologic medium total path phase shift contribution ($\theta_T$) is included in $\theta_M$.

An amplitude detector and a phase detector 62 and 64 (FIG. 4), included in the transmitter 14, measure the magnitude and phase of a current (I) that flows in transmitter antenna 16 (magtx/TX$\theta_{SC}$). A feedback control circuit 66 is used to automatically adjust the gain of a transmitter power amplifier 68, which has the effect of maintaining a constant current flow (I) in transmitter antenna 16. Such a constant antenna current will maintain a constant magnetic moment vector M, which equals NIA. A calibration sub-system 70 is preferably included in receiver 18 to generates a calibrating signal for receiver 18 that is phase coherent. Being phase coherent means that any generated phase shift may be subtracted from $\theta_M$ in order to measure a total phase shift $\theta_T$ produced by the geologic path (r) of signal 32. The accuracy of the phase measurement is generally limited to the phase jitter in the frequency transposition process, e.g., ±2 electrical degrees at 15.3775 MHz.

The radial wave impedance of a magnetic dipole immersed in a dissipative medium is largely imaginary. Therefore energy may be stored in the near field and energy is available for radiation in the far field of antenna 16. In contrast, the radial wave impedance is largely real, in the case of a short electric dipole, thus energy is dissipated in the near field and not available for radiation in the far field. Therefore, antennas 16 and 20 are preferably magnetic dipoles.

Conductivity can range over several orders of magnitude. Conductivity depends upon the porosity, availability of argillaceous matter and water saturation levels. Sedimentary siltstone, mudstone and shales have conductivities that range from $10^{-3}$ to $10^{-1}$ Siemens/meter. Dry sandstone exhibits a conductivity of $10^{-4}$ Siemens/meter which is near that of some igneous rock. Bituminous coal and metamorphic tuff exhibit similar conductivity. Water saturated, clay-filled sandstone and coals exhibit much higher conductivity in the range of $10^{-3}$ to $10^{-1}$ Siemens/meter. The conductivity of mineralized zones associated with faults and shear zones may be quite high. Sulfide veins of pyrite, niccolite, pyrrotite, chalcopyrite and arsenopyrite exhibit high conductivity of one to more than ten Siemens/meter. Gangue minerals such as quartz, calcite, barite and dolomite can all reduce the conductivity of sulfide ore. Zinc sulfide can act as an insulating gangue to reduce the conductivity of a rock mass. In a halo region of an ore body, sulfides are often disseminated into quartz. The conductivity of disseminated sulfide rock is near one millisiemens/meter, which is similar to metamorphic rock (schist). Evaporates such as trona, halite (salt) and sylvite (potash) range between $10^{-5}$ to $10^{-4}$ Siemens/meter, near that of carbonates. The conductivity of oil reservoir rock depends on the porosity and the conductivity of water (brine) in the pore space. The higher the oil/gas saturation, the lower the conductivity.

The wavelength in any media is given by $$\lambda = \frac{2\pi}{\beta}$$

meters, where the wavelength is the distance traveled by the electromagnetic wave in the media that results in $2\pi$ radians of phase shift. The wavelength decreases rapidly with the rock mass conductivity and frequency.

The skin depth ($\delta$) is given by, $$\delta = \frac{1}{\alpha}$$

meters. The skin depth is the distance traveled in the media that results in a 8.686 dB change in attenuation.

In slightly conducting mediums, when a conduction current exceeds displacement currents, $\sigma/\omega\epsilon > 10$, equations, $$\beta = \omega \left[ \frac{\mu\epsilon}{2} \left( \left[ 1 + \left( \frac{\sigma}{\epsilon\omega} \right)^2 \right]^{\frac{1}{2}} + 1 \right) \right]^{\frac{1}{2}} \quad (8)$$

and, $$\alpha = \omega \left[ \frac{\mu\epsilon}{2} \left( \left[ 1 + \left( \frac{\sigma}{\epsilon\omega} \right)^2 \right]^{\frac{1}{2}} - 1 \right) \right]^{\frac{1}{2}}, \quad (9)$$

are approximated by:

$$\alpha = \beta = \left[ \frac{\omega\mu\sigma}{2} \right]^{\frac{1}{2}}. \quad (21)$$

Increases in frequency or conductivity each contribute in the same way to increase both the attenuation factor (rate) and phase constants. The magnitude of the electromagnetic wave changes by approximately fifty-five dB for each wavelength traveled in the medium. Equation (21) suggests that the propagation constants are relatively independent of the media dielectric constants. The ratio of $\alpha/\beta$ is approximately unity for a range of conductivity and frequencies.

When the attenuation/phase constant ratio is near unity, conduction current predominates in the medium. When the attenuation/phase constant ratio is near zero, displacement current predominates in the medium. For a non-conducting media, the characteristic impedance is a pure resistance. In a slightly conducting medium, the media characteristic or wave impedance becomes complex.

An image plane, or planes, between drillholes 12 may be divided into pixels (cells). Down-the-hole measuring stations, such as located by indicators 22 and 24, may be established at 1.5 meter intervals within drillholes 12. Image pixels are created by drawing imaginary lines across the image plane. The lines are drawn from points midway between the measuring stations. A vertical boundary for each pixel is created by dividing the length of the horizontal line by the number of measuring stations.

Direct and a set of offset diagonal ray paths emanate from each transmit measuring station (T1-T4). During a tomography scanning process, receiver 18 is successively moved to each of the measuring station (R1-R4). The magnitude and total phase ($\phi_T$) are measured and recorded in DPU 26. The measured data is processed by an iterative reconstruction algorithm.

Dines and Lytle (above) describe an algorithm that can be used to process such data. Since the $k^{th}$ ray path distance ($d_{ijk}$) through each pixel is known, the average attenuation rate ($\alpha_{ij}$) in each pixel can be determined from the total loss $(\alpha r)_k$ measured on the $k^{th}$ path as:

$$(\alpha r)_k = \sum_{i=1}^{I} \sum_{j=1}^{J} \alpha_{ij} d_{ijk}. \quad (22)$$

The iterative process solves k linear equations in ij unknowns. The average value of $\alpha_{ij}$ is determined from the set of measured path loss values $(\alpha r)_k$. The summation in the above equation is over all values of i and j, where $d_{ijk}=0$ in pixels not intersected by the $k^{th}$ ray path. Because there may be length and width limitations in a scan, the number of equations is usually insufficient to determine $\alpha_{ij}$ uniquely. Therefore, the set of linear equations may be over or under determined. Instead of a direct matrix conversion, iterative solutions are used to determine $\alpha_{ij}$. An algebraic reconstruction technique (ART) treats one equation at a time, and changes pixel values found processing each ray path data. Simultaneous iterative reconstruction techniques (SIRT) change the pixels after processing all paths.

Iterative processing begins with an initial estimate of the pixel values, e.g., conductivity, attenuation rate, or phase shift. Multiple iterations routinely modify the pixel values until the ray path signals synthetically determined from the pixels are within a few percent of the measured data set. The set of pixel values represents the model of plume 11.

A contouring algorithm is used in DPU 26 to generate contours of constant pixel value curves across the image plane. The interpretation of the reconstructed images will always depend upon the knowledge and skill of the geologist. It also depends upon the application of electromagnetic wave theory.

An issue in processing measured magnitude and phase data with the SIRT or ART algorithms is the validity of the straight ray assumption used in SIRT. Dines and Lytle (above) describe three criteria that must be satisfied. First, any transmitter-to-receiver separation distance must be greater than $\lambda/2\pi$. Second, the refraction index should vary slowly. Third, $\lambda$ should be much less than $\pi\delta$. The first criteria is satisfied by locating the receiving antenna 20 in the far field ($r > \lambda/2\pi$) of the transmitting magnetic dipole antenna 16. The frequency of the radiowave can be increased until the wavelength ($\lambda$) in the soils (rock mass) satisfies the criteria. The second criteria assumes that diffraction effects are negligible in the rock mass. The third requirement means that the displacement currents predominate in the rock mass. Although the work of Dines and Lytle is recognized as fundamental in geotomography, the validity of the ray path assumption can be extended to cases in which conduction currents dominate in the rock mass ($\sigma >> \omega\epsilon$). The aspect of resolution should be addressed in a geotomographic problem.

The straight ray path assumption in a lossy medium is considered in this paradigm. A ray path can be simulated using a Fresnel scattering ellipsoid. The transmitting and receiving antennas 16 and 20 are located at the foci of such an ellipsoid. The interior of the ellipsoid is assumed to include a homogeneous rock mass. The surface of the ellipsoid is coincident with an anomalous zone. Fresnel surfaces may represent the locus of scatterers that generate constant phase secondary waves at receiver 18 location. Within the ellipsoid, signals on paths to the location of receiver 18 arrive with approximately the same phase. The secondary waves arrive simultaneously with the primary wave. The primary and secondary waves add vectorally to create the total wave. The major and minor axes of the ellipsoid decrease with increasing frequency. Increasing the frequency until all of the radiowave energy is absorbed on the major axis will force the minor axis to approach zero. This will maximize the image resolution possible. Therefore, to maximize resolution, a fourth requirement of maximum frequency is added to the original requirements described by Dines and Lytle. The problem of Fresnel diffraction by a straight edge in a lossy medium has been evaluated. Hill analyzes the straight edge problem where it is assumed to block transmission below the direct path. When a Kirchhoft approximation is made for the aperture field, the solution is given in terms of Fresnel integrals. Plotting the Fresnel integral in the complex plane results in a Cornu spiral. They spiral to the final value more rapidly in a lossy medium. The physical interpretation of the Cornu spiral behavior is that the outer zones in a lossy medium have more effect on propagation and scattering than in a lossless medium.

In a conductive rock mass, the attenuation rate is significant. The rate can approach 100 dB/30.4 meters. Given, $r_1 + r_2 = r_{DIR} + $ six meters, the maximum value of the secondary wave will be twenty dB below the primary wave. Scattering from the ellipsoid surface can easily add twenty to forty dB of attenuation to the secondary signal. The fact that the attenuation of the secondary wave is significant in a slightly conducting rock mass creates an ellipsoid with a large major to minor axis ratio. This gives rise to the notion that the ellipsoid is a narrow beam or ray path, and is why the SIRT algorithm can be used in rock mass imaging. While the straight ray path assumptions can be used in geotomography inversion, tomography inversion research featuring forward modeling and inversion with Green's functions eliminate the need for the ray path assumption. In this case, a volume integral and volume pixels are used to define wave propagation beyond the Dines and Lytle image plane. The volume integral modeling and inversion routines can process the full-field data acquired with the instrumentation described herein.

EXPERIMENTAL TESTS

A radio imaging method (RIM) survey was conducted at a chemical waste landfill. A first objective of the survey was to gather high resolution tomographic images of vertical slices within and across a landfill. A second objective was to demonstrate the reciprocity and repeatability of RIM technology. Four boreholes, UCAP1, UCAP2, UCAP3 and TEVES1 were available allowing for the generation of six tomographic images, e.g., FIGS. 5–10. The images varied in range from 21.5 feet to 50.75 feet. Depth varies for each image from fifteen to ninety feet. All of the tomographic surveys were conducted using a frequency of fifteen MHz.

The secondary objective of demonstrating the reciprocity and repeatability was accomplished by measuring twenty-three reciprocal and six repeat ray paths. The reciprocal ray paths differed by an average of 0.014 millivolts. A maximum difference was 0.07 millivolts. Sixteen of the twenty-three paths differed by 0.007 millivolts or less. The repeatability of the RIM technology was demonstrated more extensively in a prior test. Six repeat measurements had an average error of 0.00067 millivolts and a maximal error of 0.00102 millivolts. Direct ray data, e.g., the transmitter 14 and receiver 18 situated at the same depth, was also collected for selected bore hole pairs at frequencies of ten MHz and six MHz. Direct ray data was collected at ten MHz for three of the tomographic image planes. The direct ray data was collected at six MHz in two of the image planes.

Analysis of the survey data was limited by a lack of support information. FIG. 5 illustrates an image obtained between boreholes UCAP1 and UCAP3, the bottom of a pit at about twenty-five feet may be identified. An area of high conductivity can be identified from thirty to forty-five feet deep in the center of the tomographic image. The high attenuation rates appear to image an area of seepage below the landfill.

FIGS. 6–10 illustrate tomographic images that were obtained with additional boreholes, UCAP2, TEVES1.

The survey was conducted using a single RIM transmitter (e.g., transmitter 14) placed in a first hole and a single RIM receiver (e.g., receiver 18) in a second hole. Stations were established from 15 to 90 feet in depth in five foot increments for each hole. Frequencies of 15.3575 MHz, 10.2375 MHz, and 6.4975 MHz were used for tomographic data collection. Hole location information was provided, but field measurements of the distance between holes indicated the location information was inaccurate. The measured values were used and a coordinate system was established with hole UCAP1 at 100,100.

Tomographic data was collected in a series of ray path fans. The transmitter 14 was moved to a station location. Receiver 18 was moved to a station location and a measurement was made. Receiver 18 was then moved to a next station location and a next measurement was made. Receiver 18 was moved and measurements were made until the ray path fan was complete. The ray path fan was limited to forty-five degrees above or below the transmitter. The transmitter was then moved to a new station and the next ray path fan was collected.

Reciprocity data was collected in holes UCAP1 and UCAP3. The tomography data was collected with the transmitter 14 in hole UCAP3 and receiver 18 in hole UCAP2. The transmitter and receiver were then switched and three ray path fans were measured. The transmitter 14 was placed at the fifteen, sixty and ninety foot stations. Twenty-three ray paths were measured for the reciprocity test.

The repeatability data was collected in conjunction with the reciprocity data. The first ray path fan of the reciprocity data was re-measured after the completion of the reciprocity survey.

Direct ray measurements were made between selected hole pairs at two additional frequencies. The direct ray is a measurement made with the transmitter 14 and receiver 18 at the same depth stations. A frequency of ten MHz was used to collect direct ray data in three of the tomographic image planes. A frequency of six MHz was used to collect direct ray data in two of the image planes.

Transmitter and receiver calibrations were taken at each station. These calibration values were used to normalize the data. Data was organized in a matrix format. A data matrix is a convenient format for presenting RIM survey data. Additionally, the data matrix is a convenient format for mathematically manipulating data with a computer. Each matrix value relates to the ray path whose receiver station is directly above it and whose transmitter station is to its left. Ray path values which differ greatly from adjacent ray path values indicate rapidly changing geology. The direct rays are ray paths which travel perpendicular to a rib line and, therefore, travel the shortest possible distance. These direct rays are useful in locating the lateral extent of anomalous areas.

Measured signal strength voltage matrices are the field data normalized with the calibration information. The data in these matrices are recorded in millivolts. Sigma matrices are the calculated conductivity values reported in Siemens. The tomographic images show three horizontal boundaries. The first, at twenty-five feet, may be the bottom of a landfill pit. The other two, at about forty-five and sixty-five feet, are probably geologic boundaries. Drillhole TEVES1 was cased with copper to a depth of twenty to twenty-five feet. This casing acts as a secondary source which strongly affected the shallow data on all tomographies to this hole. Two areas of high conductivity are imaged, which may indicate subsurface leakage plumes. The first is on the tomography from hole UCAP1 to UCAP3, FIG. 5. This image is within the landfill pit. An area of high attenuation extends from a depth of thirty to forty-five feet. The second area is on the image from hole UCAP2 to TEVES1, FIG. 6. A high attenuation zone extends from about forty-five to fifty feet.

Plume 11 has been described herein as a toxic plume. However, the present invention is not limited to just the detection of toxic plumes from chemical waste containment sites. For example, the present invention may be used in the mining of gold, where cyanide is injected into a rock mass and the chemically reacted gold is pumped out.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for locating mobile plumes in soils beneath and adjacent to surface waste containment sites, comprising:
   a radio transmitter and antenna for placement in a first underground drillhole proximate to a surface waste containment site;
   a radio receiver and antenna for placement in a second underground drillhole opposite to said first drillhole relative to said surface waste containment site and for measuring phase and attenuation data related to received radio signals from the radio transmitter and antenna;
   position determining means coupled to each of the radio transmitter antenna and radio receiver antenna for gauging a plurality of locations of said radio transmitter antenna within said first underground drillhole and a plurality of locations of said radio receiver antenna within said second underground drillhole and having an output for antenna position data;
   a data processing unit coupled to the radio transmitter, the radio receiver and the positioning determining means for analyzing phase and attenuation data from the radio receiver together with said antenna position data from said output of the position determining means, and for synchronizing a transmitted signal from the radio transmitter and a local oscillator signal for the radio receiver;
   soil plane imaging means and time keeping means connected to the data processing unit for constructing a time series of conductivity images of soil plane that includes the positions of the radio transmitter antenna and radio receiver antenna as represented in said antenna position output data; and
   non-metallic means for coupling a plurality of signals between the radio transmitter and antenna and radio receiver and antenna with the data processing unit, wherein re-radiated radio signals are prevented.

2. The system of claim 1, further comprising:
   frequency adjustment means connected to the radio transmitter and radio receiver for making an operational frequency of the radio transmitter and antenna and radio receiver and antenna adjustable wherein said operational frequency may be increased to a point at which said received radio signals from the radio transmitter and antenna are reduced substantially to zero due to increasing absorption by a material body located between the radio transmitter and antenna and radio receiver and antenna;

3. The system of claim 1, further comprising:
   tomographic means coupled to the data processing unit and soil plane imaging means for generating radiowave attenuation and electrical conductivity maps of soil planes intersecting said first and second underground drillholes wherein a plume related to the surface waste containment site may be profiled if present.

4. The system of claim 1, wherein:
the radio receiver antenna comprises a gradiometer type of electromagnetic dipole antenna and the radio receiver includes computational means for summing and differencing signals from two identical, but opposite-polarity halves, wherein sensitivity to a scattered secondary field may be improved by use of said differencing signals.

5. The system of claim 4, further comprising:
tomography algorithmic means connected to the data processing unit and soil plane imaging means for processing data extracted from a reception of signals related to said scattered secondary field and for generating conductivity maps of regions between said underground drillholes.

6. The system of claim 1, further comprising:
transmitter calibrating means connected to the radio transmitter for adjusting and controlling the power output level and phase of a transmitter output carrier.

7. The system of claim 1, further comprising:
receiver calibrating means connected to the radio receiver for determining the input sensitivity and phase shifts of said receiver to received radio signals.

8. A system for locating mobile plumes in soils beneath and adjacent to a surface waste containment site, comprising:
a radio transmitter and antenna for placement in a first plurality of underground drillholes proximate to a surface waste containment site;
a radio receiver and antenna for placement in a second plurality of underground drillholes opposite to corresponding members of said first plurality of drillholes and relative to said surface waste containment site;
position determining means for gauging the location of said radio transmitter and antenna within said first plurality of underground drillholes and the location of said radio receiver and antenna within said second plurality of underground drillholes and having an output for antenna position data;
a data processing unit for analyzing data from radio receiver and antenna and position determining means and for measuring radio signal attenuation and carrier phase shift between the radio transmitter and antenna and radio receiver and antenna, and for synchronizing a transmitted carrier signal from the radio transmitter and antenna;
soil plane imaging means and time keeping means connected to the data processing unit for constructing a time series of conductivity images of a soil plane that includes the positions of the radio transmitter antenna and radio receiver antenna as represented in said antenna position output data; and
non-metallic means for coupling signals between the radio transmitter and antenna and radio receiver and antenna with the data processing unit.

9. The system of claim 8, further comprising:
three-dimensional tomographic means coupled to the data processing unit for generating radiowave attenuation maps of soil volumes having intersections with said first and second plurality of underground drillholes wherein a plume related to the surface waste containment site may be profiled in three-dimensions if present.

10. The system of claim 8, wherein:
the radio receiver antenna comprises a gradiometer type of electromagnetic dipole antenna and the radio receiver includes computational means for summing and differencing signals from two identical, but oppositely wound parts, wherein sensitivity to a scattered secondary field may be improved by use of said differencing signals.

11. The system of claim 10, further comprising:
tomography algorithmic means connected to the data processing unit for processing data extracted from a reception of signals related to said scattered secondary field and for generating conductivity maps of regions between said underground drillholes.

12. The system of claim 10, further comprising:
frequency adjustment means connected to the radio transmitter and the radio receiver for making an operational frequency of the radio transmitter and antenna and radio receiver and antenna adjustable wherein said operational frequency may be increased to a point at which said received radio signals from the radio transmitter and antenna are reduced substantially to zero due to increasing absorption by a material body located between the radio transmitter and antenna and radio receiver and antenna;

13. A toxic waste containment facility subject to leaking hazardous plumes into soils beneath and adjacent to the site, comprising:
a plurality of substantially horizontal underground drillholes adjacent to and below a waste containment pit;
a radio transmitter and antenna for placement in a first of said underground drillholes proximate to said waste containment pit;
a radio receiver and antenna for placement in a second of said underground drillholes opposite to said first drillholes;
position determining means for gauging a plurality of locations of said radio transmitter and antenna within said first underground drillhole and of said radio receiver and antenna within said second underground drillhole and having an output for antenna position data;
a data processing unit for analyzing data from radio receiver and antenna and position determining means and for measuring radio signal attenuation between the radio transmitter and antenna and radio receiver and antenna, and for synchronizing a transmitted carrier signal from the radio transmitter and antenna to a local oscillator included in the receiver for synchronous operation;
soil plane imaging means and time keeping means connected to the data processing unit for constructing a time series of conductivity images of a said plane that includes the positions of the radio transmitter antenna and radio receiver antenna as represented in said antenna position output data: and
non-metallic means for coupling signals between the radio transmitter and antenna and radio receiver and antenna with the data processing unit.

14. The facility of claim 13, wherein:
the radio transmitter includes a phase synchronous continuous wave transmitter; and the data processing unit comprises means for accepting as data a plurality of phase shift measurements.

15. The facility of claim 13, further comprising:
transmitter calibrating means connected to the radio transmitter for adjusting and controlling the power output level and phase of said transmitted carrier signal from the radio transmitter and antenna; and
receiver calibrating means connected to the radio receiver for determining the input sensitivity and phase shifts of the receiver to a received radio signal.

16. A toxic waste containment facility subject to leaking hazardous plumes into soils beneath and adjacent to the site, comprising:
a plurality of substantially horizontal underground drillholes adjacent to and below a waste containment pit;
a phase synchronous continuous wave radio transmitter and antenna for placement in a first of said underground drillholes proximate to said waste containment pit;
a radio receiver and an electromagnetic gradiometer type dipole antenna for placement in a second of said underground drillholes opposite to said first drillholes and including means for summing and differencing signals from two identical, but oppositely wound parts of the antenna, wherein sensitivity to a scattered secondary field may be improved by use of said differencing signals;
transmitter calibrating means for adjusting and controlling the power output level and phase of a transmitted carrier signal from the radio transmitter and antenna;
receiver calibrating means for determining the input sensitivity and phase shifts of the receiver to a received radio signal;
frequency adjustment means for making an operational frequency of the radio transmitter and antenna and radio receiver and antenna adjustable wherein said operational frequency may be increased to a point at which said received radio signals from the radio transmitter and antenna are reduced substantially to zero due to increasing absorption by a material body located between the radio transmitter and antenna and radio receiver and antenna;
position determining means for gauging a plurality of locations of said radio transmitter and antenna within said first underground drillhole and of said radio receiver and antenna within said second underground drillhole and having an output for antenna position data;
a data processing unit for analyzing data from radio receiver and antenna and position determining means and for measuring radio signal attenuation between the radio transmitter and antenna and radio receiver and antenna, and for synchronizing a transmitted carrier signal from the radio transmitter and antenna to a local oscillator included in the receiver for synchronous operation, and for accepting as data a plurality of phase shift measurements from the receiver;
soil plane imaging means and time keeping means connected to the data processing unit for constructing a time series of conductivity images of a soil plane that includes the positions of the radio transmitter antenna and radio receiver antenna as represented in said antenna position output data: and
non-metallic means for coupling signals between the radio transmitter and antenna and radio receiver and antenna with the data processing unit.

17. A method of monitoring chemical waste containment sites for underground seepage of plumes, the method comprising the steps of:
synchronizing a carrier frequency of a transmitter and a local oscillator of a receiver able to receive said carrier frequency such that a phase shift of a radiowave propagation between said transmitter and receiver may be measured;
calibrating a power output level of said transmitter and a reception sensitivity of said receiver such that attenuation of said radiowave propagation between said transmitter and receiver may be measured;
positioning said transmitter in a first underground drillhole proximate to a chemical waste containment site;
positioning said receiver in a second underground drillhole proximate to a chemical waste containment site;
measuring phase shift and attenuation of a plurality of radiowave propagations between said transmitter and receiver at a plurality of positions of said transmitter and receiver within their respective first and second underground drillholes;
soil plane imaging data representing antenna position, phase shift and attenuation obtained from the step of measuring with a data processing unit and thereafter constructing a time series of conductivity images of a soil plane that includes the positions of said radio transmitter antenna and said radio receiver antenna as represented in said antenna position output data; and
determining a set of electrical parameters related to an image plane of the underground geology between said plurality of positions of said transmitter and receiver.

18. The method of claim 17, wherein:
the step of determining includes calculating the phase shift, $$\phi_T = -\beta r + \tan^{-1} \frac{1 + 2\left(\frac{\alpha}{\beta}\right)(\beta r)}{\frac{1}{\beta r} - \beta r + \left(\frac{\alpha}{\beta}\right)^2 \beta r + \left(\frac{\alpha}{\beta}\right)}$$

where, $\alpha$ is an attenuation constant, and $\beta$ is a phase constant.

19. The method of claim 17, further comprising the subsequent step of:
tomographically constructing a contour map of said underground geology using a known $k^{th}$ ray path distance ($d_{ijk}$) through each pixel to determine the average attenuation rate ($\alpha_{ij}$) in each pixel from a measured total loss ($\alpha r)_k$, obtained in the step of measuring phase shift and attenuation, on the $k^{th}$ path, according to:

$$(\alpha r)_k = \sum_{i=1}^{I} \sum_{j=1}^{J} \alpha_{ij} d_{ijk}.$$

20. The method of claim 17, further comprising the subsequent steps of:

positioning said transmitter in a third underground drillhole proximate to said chemical waste containment site;

positioning said receiver in a fourth underground drillhole proximate to said chemical waste containment site;

measuring phase shift and attenuation of said radiowave propagation between said transmitter and receiver at a plurality of positions of said transmitter and receiver within their respective first through fourth underground drillholes; and determining a set of electrical parameters related to a plurality of image planes of the underground geology between said plurality of positions of said transmitter and receiver; and drawing three-dimensional images of said underground geology using tomographic reconstruction wherein plumes may be identified and tracked over time.

21. The method of claim 17, further comprising the preliminary step of:

increasing an operational frequency of said radio transmitter and antenna and radio receiver and antenna to a point (FT) at which a received radio signal from the radio transmitter and antenna is reduced substantially to zero due to increasing absorption by a material body located between said first and second underground drillholes; and storing data related to said point $F_T$ for tomographic processing.

22. The method of claim 17, further comprising the subsequent step of:

processing data corresponding to a signal received by a differencing electromagnetic gradiometer dipole antenna included in said receiver and related to a scattered secondary field for construction of a conductivity map of a region between said drillholes.

* * * * *